Figure 1:
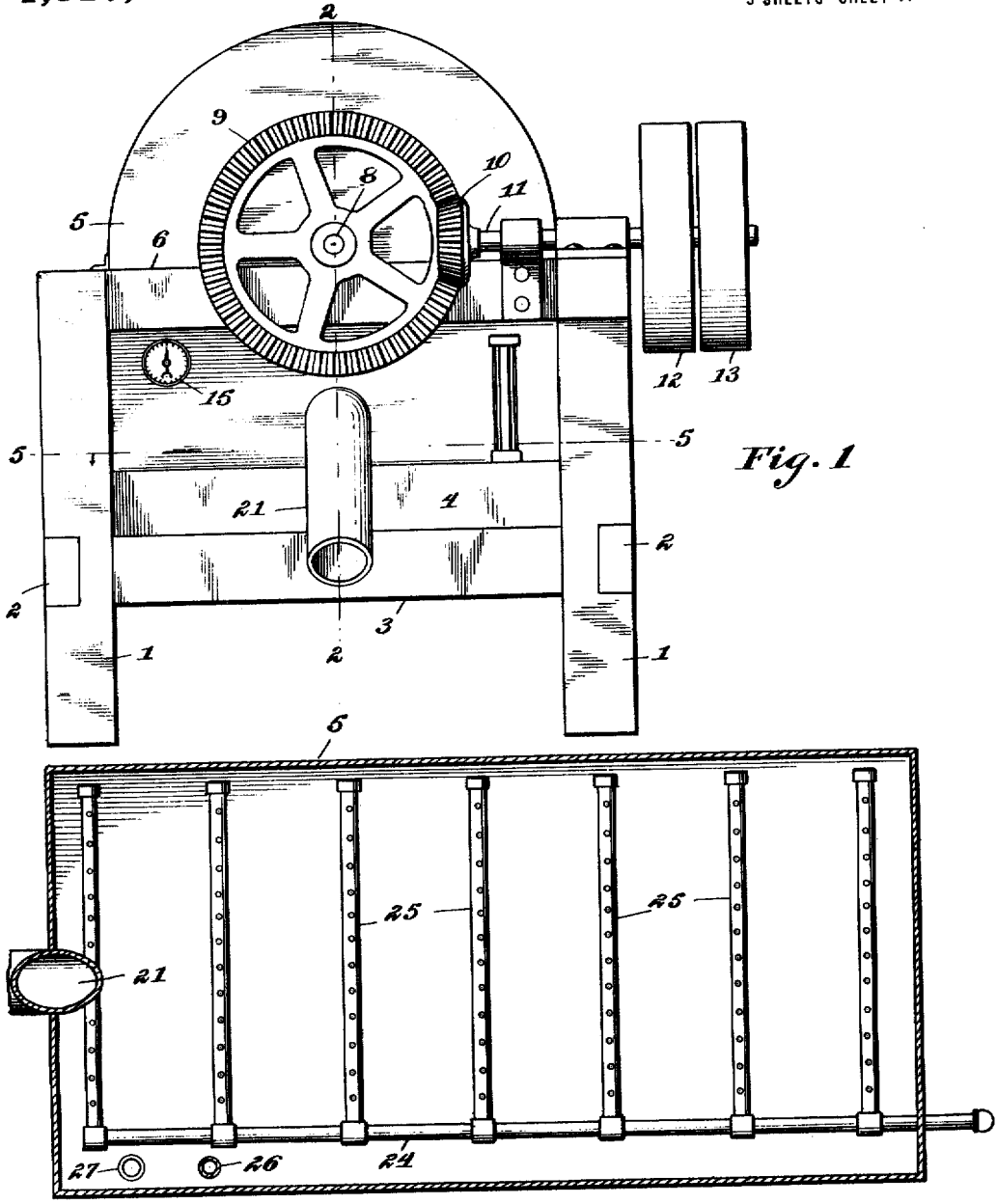

A. P. SHEPARD.
FRUIT PROCESSING MACHINE.
APPLICATION FILED OCT. 6, 1916.

1,317,898.

Patented Oct. 7, 1919.
3 SHEETS—SHEET 3.

Witnesses

Inventor
Artemas P. Shepard,
By Victor J. Evans
Attorney

UNITED STATES PATENT OFFICE.

ARTEMAS P. SHEPARD, OF FRESNO, CALIFORNIA.

FRUIT-PROCESSING MACHINE.

1,317,898. Specification of Letters Patent. Patented Oct. 7, 1919.

Application filed October 6, 1916. Serial No. 124,162.

*To all whom it may concern:*

Be it known that I, ARTEMAS P. SHEPARD, a citizen of the United States, residing at Fresno, in the county of Fresno and State of California, have invented new and useful Improvements in Fruit-Processing Machines, of which the following is a specification.

This invention pertains to apparatus for treating raisins, fruits, nuts and other similar articles to alter the physical condition and to render the same more salable.

The improvement is particularly adapted for the preparation of raisins, prunes and figs for the market, and is designed to provide means for moistening, cleaning, steaming or drying the same to properly process the fruit to render the pulp thereof sufficiently soft and the skin thereof properly cleaned.

I accomplish the above referred to objects and others which will be apparent by a suitable apparatus, such as is illustrated by the accompanying drawings, it being understood, however, that the structural features therein illustrated are merely conventional and that I am entitled to all such departures therefrom as fall within the scope of the appended claim.

Figure 2:
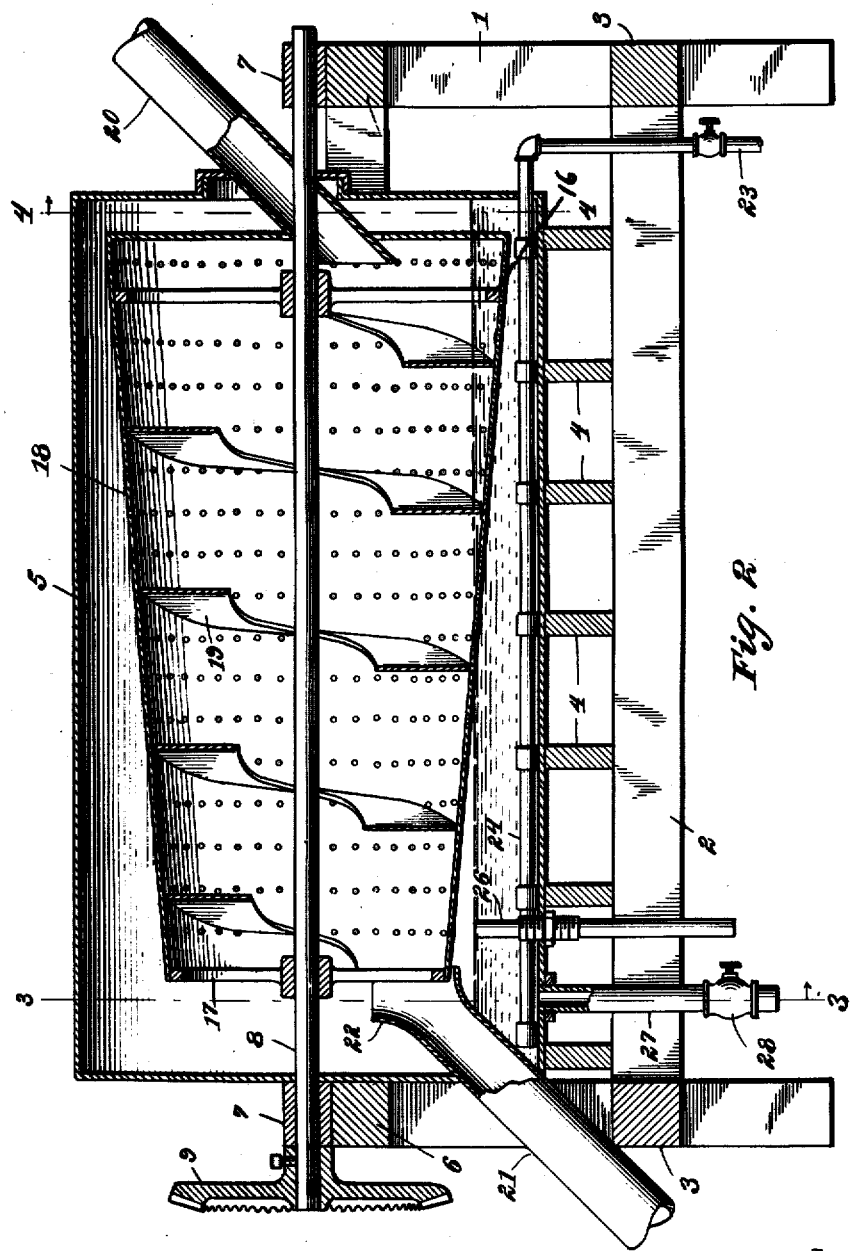
Figure 3:
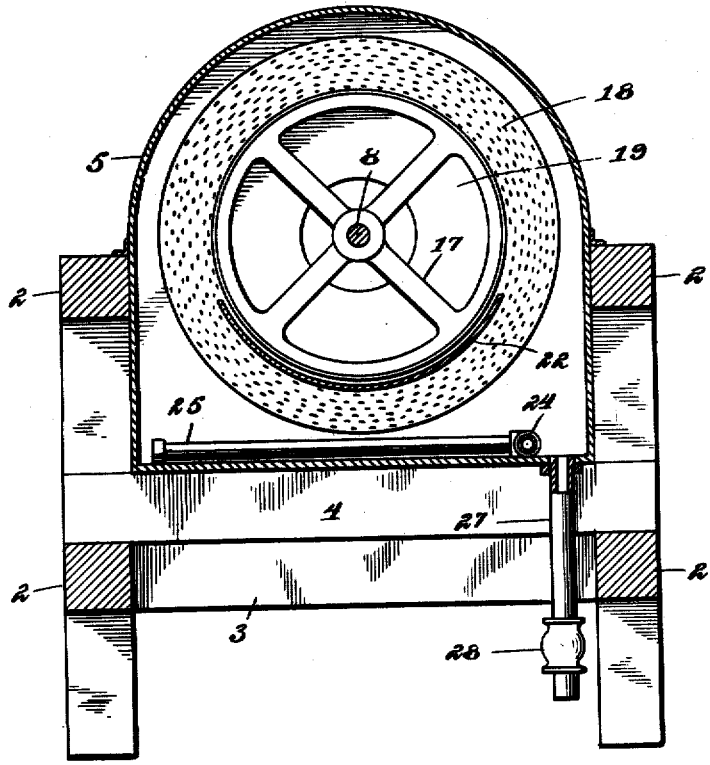
Figure 4:
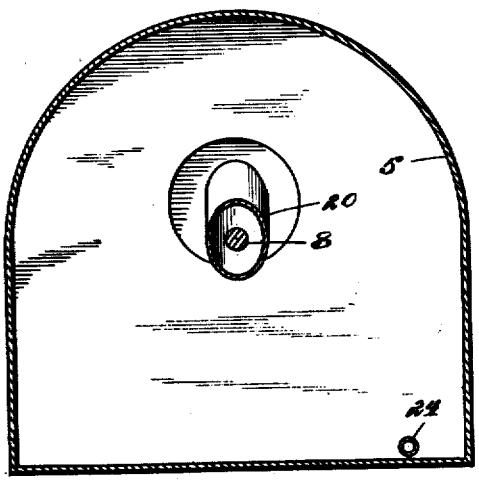

In the drawings:

Figure 1 is a front end view of an apparatus constructed in accordance with the present invention, Fig. 2 is a central vertical longitudinal sectional view through the same, approximately on the line 2—2 of Fig. 1, Fig. 3 is a transverse sectional view approximately on the line 3—3 of Fig. 2, Fig. 4 is a similar transverse sectional view approximately on the line 4—4 of Fig. 2, and Fig. 5 is a horizontal sectional view approximately on the line 5—5 of Fig. 1.

In the structure disclosed by the drawings I construct a frame of a substantially rectangular formation, including vertical corner posts 1 connected by longitudinal and transverse members 2 and 3, and mount upon the longitudinal members transversely arranged joists 4 upon which rests a tank or container, indicated by the numeral 5. Also as disclosed by the drawings the lower or bottom portion of the tank or container is flat and the upper portion thereof is rounded, the sides being vertically straight.

The corner posts 2 terminate a slight distance above the center of the tank or container and are connected at their said terminals by beams 6. The beams 6 are each centrally provided with alining bearings 7—7 and journaled within these bearings is a longitudinally arranged shaft 8 which projects through suitable openings in the closed ends of the tank or container 5. The shaft 8, at what I will term the forward or discharge end of the apparatus, is projected a suitable distance beyond the bearing 7 and has keyed or otherwise secured thereto a beveled tooth wheel 9 which meshes with a beveled gear 10, the said gear being arranged upon a shaft 11 that is disposed transversely of the frame and of the tank or container and which is journaled in suitable bearings provided upon one of the beams 6 and upon one of the corner posts 1. The outer end of the shaft 11 has arranged thereon a fixed wheel 12 and a loose wheel 13, and these wheels are adapted to receive an endless belt which is trained over a suitable pulley wheel (not shown) that receives motion from any suitable source of power. Upon the outer or discharge end of the tank I have arranged a water gage as well as a thermometer or indicating device 15 whereby the temperature of the interior of the tank can be readily ascertained.

The shaft 8, inwardly of the tank or casing and at a suitable distance from the end walls thereof has keyed or otherwise secured thereon spider members 16 and 17 respectively, each of the spiders being provided with a rounded rim, and the spider 16 is of a materially greater cross sectional diameter than that of the spider 17, the said spider 16 being arranged adjacent to the rear of what may be termed the rear of the apparatus. Secured to the peripheries of the spiders 16 and 17 and projecting a suitable distance rearwardly from the spider 16 is a reticulated member 18. The reticulated member it will be noted is in the nature of a hollow cone, the rear end thereof being disposed only a slight distance above the floor of the tank or container, while the outer end (which terminates with the spider 17) is disposed a considerable distance above the said bottom wall of the tank or container. The reticulated hollow conical member 18 may comprise a single strip that is wound slightly upon itself, or the said member may have arranged upon its interior a spiral or helical rib or band 19, and the purpose of this spiral member will presently be set forth.

The numeral 20 designates the inlet spout for the raisins or the other articles to be treated, the same being disposed angularly at what I have termed the rear of the apparatus and the mouth of said spout is projected within the hollow cone-shaped reticulated member 18, the said mouth being disposed only a short distance to the rear of the spider 16.

The outlet spout for the material to be treated is indicated by the numeral 21, the same extending angularly through the tank or container 5 at the front and lower end thereof, the spout being widened laterally, as at 22, at the portion thereof received within the tank or container and this widened portion is disposed directly below the reduced end of the reticulated member 18 as well as outwardly of the spider 17, so that all of the material delivered through the reticulated member will be directed through the spout.

The numeral 23 designates a valved steam inlet pipe which is connected with the steam pipe 24 that extends longitudinally of the tank and is disposed adjacent to one of the sides thereof. The pipe 24 may rest upon the bottom wall of the tank or container and the same is provided at spaced intervals with a plurality of laterally extending perforated pipe members 25, the ends of the said pipes 25 being closed.

The numeral 26 designates an overflow pipe which is arranged adjacent to the outlet end of the apparatus and which, of course, enters the tank or container 5, while the numeral 27 designates a cleanout pipe that is also disposed adjacent to the forward or outlet end of the apparatus and which, of course, communicates with the bottom of the container or tank. The cleanout pipe is provided with a valve 28, and if desired, the overflow pipe 26 may be exteriorly threaded and arranged in the threaded bores of a suitable bushing connected with the bottom of the tank or container, whereby the overflow pipe may be vertically adjusted so that the level of the water within the tank or container may vary according to the condition of the fruit, etc., to be treated.

When the raisins, etc., are to be treated by being immersed in water, a determined quantity of the fluid is let into the tank or container in any desired or preferred manner, as for instance, the apparatus may be provided with a water inlet pipe. It will be noted by reference to Fig. 2 of the drawing that the water percolates through the reticulated member 18 at the widened end thereof, and this water may be heated by an inflow of steam through the steam pipe and the degree of the heat may be determined by the indicator or thermometer, and likewise the height of the water is determined from the water gage. The fruit is fed into the device through the inlet spout and is delivered thereby at the widened end of the cone-shaped reticulated receiving member, the fruit, of course, contacting with the water at the widened end of the said reticulated member. Power is applied to revolve the shaft which in turn revolves the reticulated member and the fruit being engaged by the spiral rib or band will be gradually moved longitudinally through the member 18 toward the discharge spout therefor. It will be noted that the fruit is only immersed in the water for a determined period in its travel through the member 18, so that when the same is brought over the dry surface of the member 18 by the spiral 19, the fruit will be dried or partially dried before the fruit is discharged through the outlet spout. By this arrangement the fruit is sufficiently moistened and treated by the warm air as well as the steam escaping from the heated water so as not only to thoroughly clean the skin thereof but also to soften the pulp.

If the fruit is in such condition as to require treatment by the steam and not by the water, the water is permitted to flow from out of the tank and the steam is admitted through the steam pipes, the fruit being delivered as just described to the conveyer 18, while still again, should it be desired to treat or "process" the fruit by only exposing the same to a heated surface the branch pipe 25 may be replaced by imperforate pipes, and in each instance of treating or "processing" the fruit, it will be noted that the same are subjected to vibration while being conveyed by the spiral of the conveying member 18, so that any foreign substance upon the outer surface or skin of the same will be removed therefrom, the said foreign substances passing through the perforations or reticulations in the member 18 and being deposited upon the floor of the tank or container and may be removed therefrom by allowing water to enter the container and pass therefrom through the cleanout pipe.

Having thus described the invention, what I claim is:

In an apparatus of the class described, a closed tank having a heated fluid at a predetermined level therein, a revoluble conveyer within the tank, said conveyer comprising a perforated cone-shaped member having its enlarged end received in the fluid and its opposite end spaced from the adjacent end wall of the tank, a spiral rib within and connected with the conveyer, an inlet spout passing through one end of the tank and communicating with the enlarged end of the conveyer, an outlet spout passing angularly through the tank at its opposite end, said outlet spout extending between the small end of the cone-shaped member and the adjacent end wall of the tank, said spout at its inner end being provided with a widened throat part having a curved wall at one side thereof conforming to the curvature of the small end of the perforated cone-shaped member and extending partly therearound beneath the same, means for revolving said conveyer whereby the material to be treated is first delivered to the heated fluid in the conveyer and from thence elevated above said heated fluid and subjected to the steam trapped within the upper portion of the tank and finally delivered in a dry state from the conveyer to the outlet spout.

In testimony whereof I affix my signature.

ARTEMAS P. SHEPARD.